(12) United States Patent
Prager et al.

(10) Patent No.: US 8,336,272 B2
(45) Date of Patent: Dec. 25, 2012

(54) DEVICE AND METHOD FOR LOCKING TWO BUILDING BOARDS

(75) Inventors: Martin Prager, Heiligengrabe (DE); Ingo Lehnhoff, Dierhagen (DE)

(73) Assignee: Flooring Technologies Ltd., Pieta (MT)

( * ) Notice: Subject to any disclaimer, the term of this patent is extended or adjusted under 35 U.S.C. 154(b) by 802 days.

(21) Appl. No.: 12/350,662

(22) Filed: Jan. 8, 2009

(65) Prior Publication Data
US 2009/0173032 A1  Jul. 9, 2009

(30) Foreign Application Priority Data

Jan. 9, 2008  (DE) .................. 10 2008 003 550

(51) Int. Cl.
*E04B 2/00* (2006.01)
*E04B 2/32* (2006.01)

(52) U.S. Cl. ..................... 52/588.1; 52/592.1

(58) Field of Classification Search ............... 52/588.1, 52/589.1, 590.2, 590.3, 591.1, 591.2, 592.2, 52/592.4; 403/334, 345, 364, 365, 366, 367, 403/368, 372, 375, 376, 381
See application file for complete search history.

(56) References Cited

U.S. PATENT DOCUMENTS

| | | | |
|---|---|---|---|
| 3,720,027 A * | 3/1973 | Christensen | 52/309.8 |
| 3,742,669 A * | 7/1973 | Mansfeld | 52/396.07 |
| 3,760,547 A * | 9/1973 | Brenneman | 52/586.1 |
| 3,919,820 A * | 11/1975 | Green | 52/396.04 |
| 4,113,399 A * | 9/1978 | Hansen, Sr. | 403/329 |
| 4,196,554 A * | 4/1980 | Anderson et al. | 52/394 |
| 4,426,820 A * | 1/1984 | Terbrack et al. | 52/590.1 |
| 4,512,131 A * | 4/1985 | Laramore | 52/586.1 |
| 4,599,841 A * | 7/1986 | Haid | 52/396.04 |
| 5,007,222 A * | 4/1991 | Raymond | 52/586.1 |
| 5,148,850 A * | 9/1992 | Urbanick | 160/231.1 |
| 5,182,892 A * | 2/1993 | Chase | 52/539 |
| 5,344,700 A * | 9/1994 | McGath et al. | 428/304.4 |
| 5,465,546 A * | 11/1995 | Buse | 52/480 |
| 5,548,937 A * | 8/1996 | Shimonohara | 52/586.1 |
| 5,694,730 A * | 12/1997 | Del Rincon et al. | 52/586.1 |

(Continued)

FOREIGN PATENT DOCUMENTS

DE  10 2006 037 614  12/2007

(Continued)

OTHER PUBLICATIONS

"5G The new standard in locking technology", URL: http://www.valinge.se/.

(Continued)

*Primary Examiner* — William Gilbert
*Assistant Examiner* — Alp Akbasli
(74) *Attorney, Agent, or Firm* — Andrew M. Calderon; Roberts Mlotkowski Safran & Cole, P.C.

(57) ABSTRACT

A device for locking two building boards connected to one another in a direction (V) perpendicular to a visible side. The device includes a first building board with a lateral edge (I) and a first groove and running parallel to the visible side. The device further includes at least one second building board with a lateral edge (II) and with a second groove and running parallel to the visible side, and a locking element that is placed in the first groove of the first building board to engage in the second groove of the second building board, when both grooves have reached an overlapping position after the connection of the building boards by a vertical lowering movement.

14 Claims, 6 Drawing Sheets

U.S. PATENT DOCUMENTS

| | | | |
|---|---|---|---|
| 5,950,389 A * | 9/1999 | Porter | 52/586.1 |
| 6,052,960 A * | 4/2000 | Yonemura | 52/393 |
| 6,065,262 A * | 5/2000 | Motta | 52/582.1 |
| 6,173,548 B1 * | 1/2001 | Hamar et al. | 52/582.1 |
| 6,182,410 B1 * | 2/2001 | Pervan | 52/403.1 |
| 6,216,409 B1 * | 4/2001 | Roy et al. | 52/589.1 |
| 6,363,677 B1 * | 4/2002 | Chen et al. | 52/586.1 |
| 6,505,452 B1 * | 1/2003 | Hannig et al. | 52/582.1 |
| 6,553,724 B1 * | 4/2003 | Bigler | 52/36.1 |
| 6,729,091 B1 * | 5/2004 | Martensson | 52/391 |
| 6,763,643 B1 * | 7/2004 | Mårtensson | 52/586.1 |
| 6,854,235 B2 * | 2/2005 | Martensson | 52/601 |
| 6,865,855 B2 * | 3/2005 | Knauseder | 52/592.1 |
| 7,251,916 B2 * | 8/2007 | Konzelmann et al. | 52/592.1 |
| 7,275,350 B2 * | 10/2007 | Pervan et al. | 52/592.1 |
| 7,377,081 B2 * | 5/2008 | Ruhdorfer | 52/588.1 |
| 7,584,583 B2 * | 9/2009 | Bergelin et al. | 52/588.1 |
| 7,614,197 B2 * | 11/2009 | Nelson | 52/582.1 |
| 8,042,311 B2 * | 10/2011 | Pervan et al. | 52/586.1 |
| 2002/0178674 A1 * | 12/2002 | Pervan | 52/385 |
| 2003/0009971 A1 * | 1/2003 | Palmberg | 52/578 |
| 2003/0024199 A1 * | 2/2003 | Pervan et al. | 52/589.1 |
| 2003/0024200 A1 * | 2/2003 | Moriau et al. | 52/592.1 |
| 2003/0037504 A1 * | 2/2003 | Schwitte et al. | 52/586.1 |
| 2003/0101674 A1 * | 6/2003 | Pervan et al. | 52/592.1 |
| 2003/0101681 A1 * | 6/2003 | Tychsen | 52/783.1 |
| 2003/0180091 A1 * | 9/2003 | Stridsman | 404/41 |
| 2003/0196405 A1 * | 10/2003 | Pervan | 52/592.1 |
| 2004/0031227 A1 * | 2/2004 | Knauseder | 52/592.1 |
| 2004/0060255 A1 * | 4/2004 | Knauseder | 52/582.2 |
| 2004/0182036 A1 * | 9/2004 | Sjoberg et al. | 52/592.1 |
| 2004/0211143 A1 * | 10/2004 | Hanning | 52/578 |
| 2004/0261348 A1 * | 12/2004 | Vulin | 52/578 |
| 2005/0193677 A1 * | 9/2005 | Vogel | 52/592.1 |
| 2005/0210810 A1 * | 9/2005 | Pervan | 52/578 |
| 2005/0235593 A1 * | 10/2005 | Hecht | 52/592.1 |
| 2005/0252130 A1 * | 11/2005 | Martensson | 52/384 |
| 2006/0032168 A1 * | 2/2006 | Thiers et al. | 52/390 |
| 2006/0070333 A1 * | 4/2006 | Pervan | 52/592.1 |
| 2006/0101769 A1 * | 5/2006 | Pervan et al. | 52/591.1 |
| 2006/0260254 A1 * | 11/2006 | Pervan | 52/592.1 |
| 2007/0006543 A1 * | 1/2007 | Engstrom | 52/582.1 |
| 2007/0028547 A1 * | 2/2007 | Grafenauer et al. | 52/586.1 |
| 2007/0151189 A1 * | 7/2007 | Yang | 52/582.2 |
| 2007/0193178 A1 * | 8/2007 | Groeke et al. | 52/578 |
| 2008/0000186 A1 * | 1/2008 | Pervan et al. | 52/588.1 |
| 2008/0010931 A1 * | 1/2008 | Pervan et al. | 52/403.1 |
| 2008/0010937 A1 * | 1/2008 | Pervan et al. | 52/588.1 |
| 2008/0028707 A1 * | 2/2008 | Pervan | 52/391 |
| 2008/0034708 A1 * | 2/2008 | Pervan | 52/792.11 |
| 2008/0104921 A1 * | 5/2008 | Pervan et al. | 52/588.1 |
| 2008/0110125 A1 * | 5/2008 | Pervan | 52/582.2 |
| 2008/0134607 A1 * | 6/2008 | Pervan et al. | 52/395 |
| 2008/0134613 A1 * | 6/2008 | Pervan | 52/582.2 |

FOREIGN PATENT DOCUMENTS

| | | |
|---|---|---|
| EP | 1 197 611 | 4/2004 |
| EP | 1 475 485 | 11/2004 |
| EP | 1 650 175 | 4/2006 |
| EP | 1 818 478 | 8/2007 |
| WO | 00/47841 | 8/2000 |
| WO | 2005/054599 | 6/2005 |
| WO | 2006/043893 | 4/2006 |

OTHER PUBLICATIONS

The European Search Report of Feb. 18, 2008.
D. Pervan "Valinge presents new locking technology", Sep. 26, 2007, 1 page.

* cited by examiner

DEVICE AND METHOD FOR LOCKING TWO BUILDING BOARDS

CROSS-REFERENCE TO RELATED APPLICATIONS

The present application claims priority under 35 U.S.C. §119 of German Patent Application No. 10 2008 003 550.5, filed on Jan. 9, 2008, the disclosure of which is expressly incorporated by reference herein in its entirety.

BACKGROUND OF THE INVENTION

1. Field of the Invention

The invention relates to a device and a method for locking two building boards connected to one another.

2. Discussion of Background Information

A locking device is known from DE 10 2006 037 614 B3. This locking device is provided on the transverse side of flooring panels. In addition to this locking device, a hook-shaped profile is embodied on the transverse side so that two panels can hook into one another with their lateral edges and thus are locked in a direction running parallel to the top side. On the longitudinal side the panels are a self-locking tongue/groove profile. During laying, the panel to be newly laid at the panel assembly already laid is first connected on the longitudinal side to a panel already laid by angling the tongue into the groove and then in the angled position pushed in the direction of the lateral edge of the panel previously laid in the same row and lowered. The hook-shaped profile engages in one another and the locking element then snaps automatically into the newly laid panel.

A similar device is known, e.g., from EP 1 818 478 A1. In this embodiment, the locking element, in order to be able to bend out, needs a counter pressure from outside. For this reason, this device is not suitable for locking panels that are connected to one another in a first row also in the vertical direction to one another.

A locking element of plastic operating in the same manner is known from WO 2005/054599 A1. In this embodiment, the locking element is beveled on the top. Similar to a door latch, by means of the bevel the locking element is pressed inwards into the groove by the panel to be newly set, when the underside of this panel meets the bevel and is further lowered.

Also, it is disclosed in WO 2006/043893 A1 and EP 1 650 375 A1 to connect floor panels with a flexible locking element that engages in recesses in both of the boards to be connected. WO 00/47841 discloses a resilient element that locks two panels connected via a tongue and groove profile and holds the connection under tension. A resilient element is known from EP 1 475 485 A2 that transfers a force to two connected panels and thus locks them in the vertical direction. EP 1 197 611 A1 discloses flooring boards that can be connected to one another via form springs. The form springs are attached by means of locking bolts to the undersides of the panels to be connected.

A locking device by the Swedish company Välinge provided for the transverse side of flooring panels is advertised under the name "5G+technology", in which device a separate locking strip of plastic is provided and the connection of two panels on their transverse sides is likewise carried out by angling the panel to be newly laid. The locking of the panel newly laid on the transverse side by the plastic strip is not carried out until a new panel is laid in the next row with the longitudinal side. This is made possible in that the locking strip is embodied from a flexible plastic and is embodied longer than the groove in which it is arranged. It projects out of the groove with one end. When the new panel is laid on the transverse side, nothing happens initially. When a new panel is placed at this joint in the next row, this panel presses the locking strip into the groove, which yields laterally, since with its other free end it abuts against a panel laid in the penultimate row, and with the area bent out engages in the groove of the newly laid panel. It is disadvantageous, on the one hand, that locking is possible in the vertical direction only via the relatively small bent-out area of the locking element. On the other hand, no secure locking in the first row of laid panels can be achieved because the panels must be laid in a floating manner. That means that the first row does not bear directly against the wall; instead a gap of 1-1.5 cm must be maintained. When a new panel is then laid in the second row, although the locking strip is pushed into the groove, due to the lack of an abutment it is not bent out, but is pushed through the groove and then projects out of the groove at the other end of the panel.

With the locking profiles currently used, the panel respectively angled down is already firmly connected to the panel assembly, since the locking of the profile occurs during or directly after the joining of the panels on their transverse sides. This has proven to be disadvantageous for the laying of floors because faulty laying is possible only by laborious unlocking of the transverse profiles.

Based on this problem, the device explained at the outset is to be improved.

SUMMARY OF THE INVENTION

The present invention is related to flooring panels with a core of wood material or wood material/plastic mixture, in a direction perpendicular to a visible side. In embodiments, the panels comprise:

a first building board with a lateral edge I and a first groove provided in the core of the building board and running parallel to the visible side;

at least one second building board with a lateral edge II and with a second groove provided in the core of the building board and running parallel to the visible side;

a locking element that is placed in the first groove of the first building board in order to engage in the second groove of the second building board, when both grooves have reached an overlapping position after the connection of the building boards by a vertical lowering movement, wherein to lock two building boards in a direction parallel to the visible side, on the lateral edge I, a lower lip projecting beyond this laterally with an outer projection projecting upwards is provided and on the lateral edge II lying opposite the lateral edge I a depression is provided directed towards the underside, which depression is embodied in a manner corresponding to the projection, and the locking element can be bent out in the transverse direction by forces acting thereon in the longitudinal direction.

In embodiments, the projection of the locking element is fixed in the depression.

The above noted problem is solved in two ways in order to make it possible for the locking element to be bent out in the transverse direction through forces acting on it in the longitudinal direction in that either the locking element has at least one projection facing the groove base, which projection engages in a recess provided in the groove and projecting into the core, or the locking element has a projection projecting upwards on one of its free ends, which projection engages in a recess provided on the underside of the lateral edge III running at a right angle to the lateral edge I provided spring.

In this way, the locking element can thus be locked in place in the first groove respectively based on the longitudinal direction.

Through embodiments, the locking element does not engage in the panel lying opposite for locking until a new panel has been laid. When a panel is newly laid in an adjacent row, the tongue pushes this panel to be newly laid onto the free end of the locking element and tries to push this into the groove in the longitudinal direction. Since the locking element can be locked in place in the groove, a displacement is ruled out and the locking element bends out in the transverse direction and thereby engages in the groove of the panel lying opposite it and not yet locked.

The locking element can comprise plastic or a wood material/plastic mixture or metal.

Through the displacement of the locking element in the longitudinal direction and also in the transverse direction and into the second groove of the second panel, without a counter pressure from outside being necessary, panels in a first row can also be locked to one another in the vertical direction by laying the second panel row.

Preferably the locking element in a first position projects out of the first groove with its free end in the longitudinal direction. In a second position, the locking element is received in the first groove and then additionally engages in the second groove.

Preferably the projection is fixed in the recess which facilitates the transport of panels not laid and ensures that the locking element does not fall out of the groove, and a secure locking in place in the groove is possible.

To increase its elasticity, the locking element can have a plurality of cut-outs inserted in the transverse direction. The cut-outs are preferably provided only in the area of the free ends of the locking element. The buckling area causing the vertical locking of the locking element will be able to transfer higher forces in the vertical direction if it is not slit, so that the pull-out strength of the joint is increased.

Preferably the locking element and the first and second groove essentially have the same length. More preferably the locking element is a little longer than the groove so that the activation of the projecting free end is simplified or improved.

The method for locking two building boards, in particular flooring panels, connected to one another in a direction perpendicular to a visible side comprises:
 the locking element is placed in the first groove such that it projects out of the groove with one free end on one side and with its other end is locked in place; and
 a third building board is placed on both building boards connected to one another and connected with them, wherein
 the third building board abuts against the free end of the locking element and thereby pushes the locking element into the groove in the longitudinal direction,
 the locking element bends out in the groove in the transverse direction, and
 the locking element through the bending-out in the transverse direction also engages in the second groove of the second building board, whereby the first and second building board are then locked to one another.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

Figure 1:
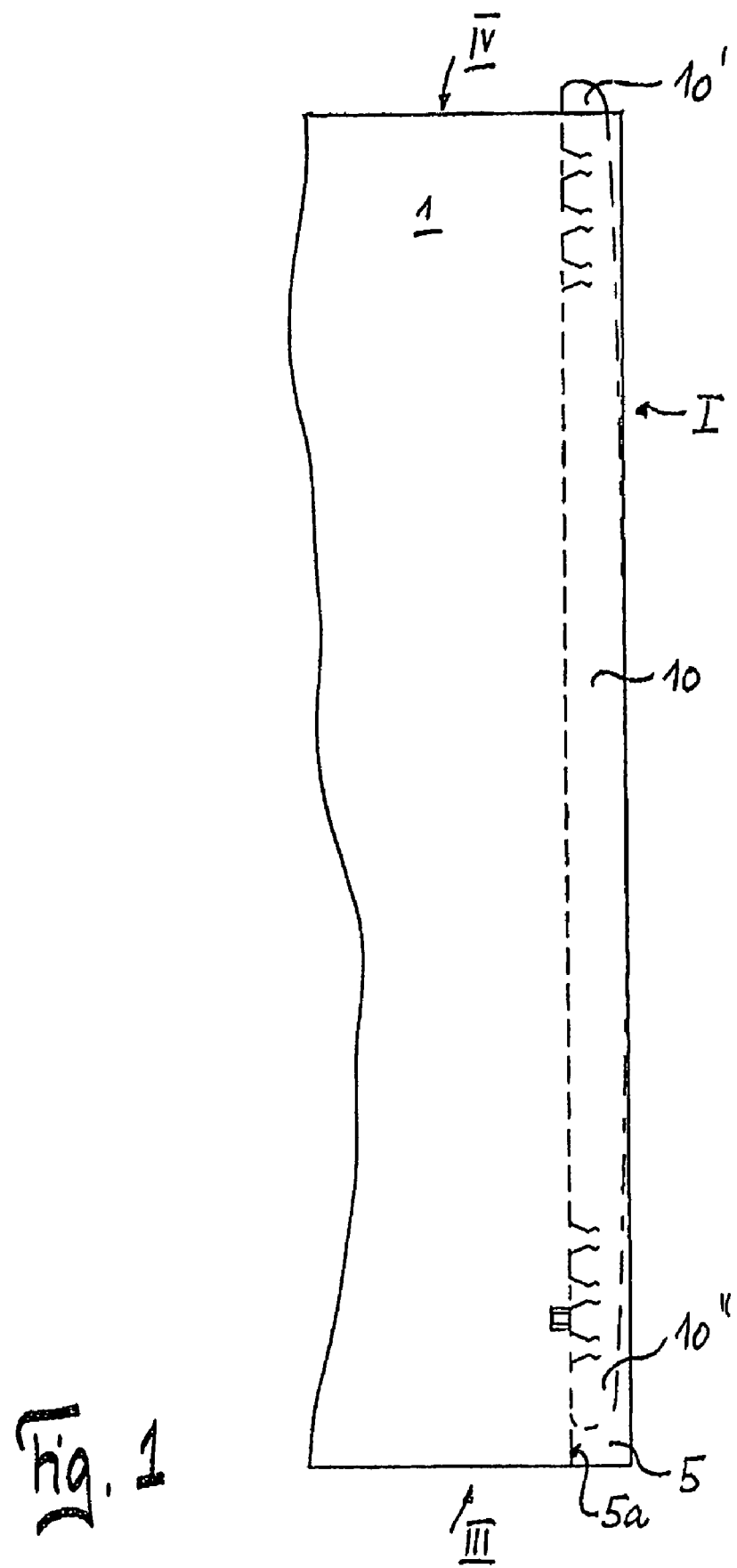
FIG. 1 shows a plan view of the first lateral edge of a flooring panel in a first position of the locking element.
Figure 2:
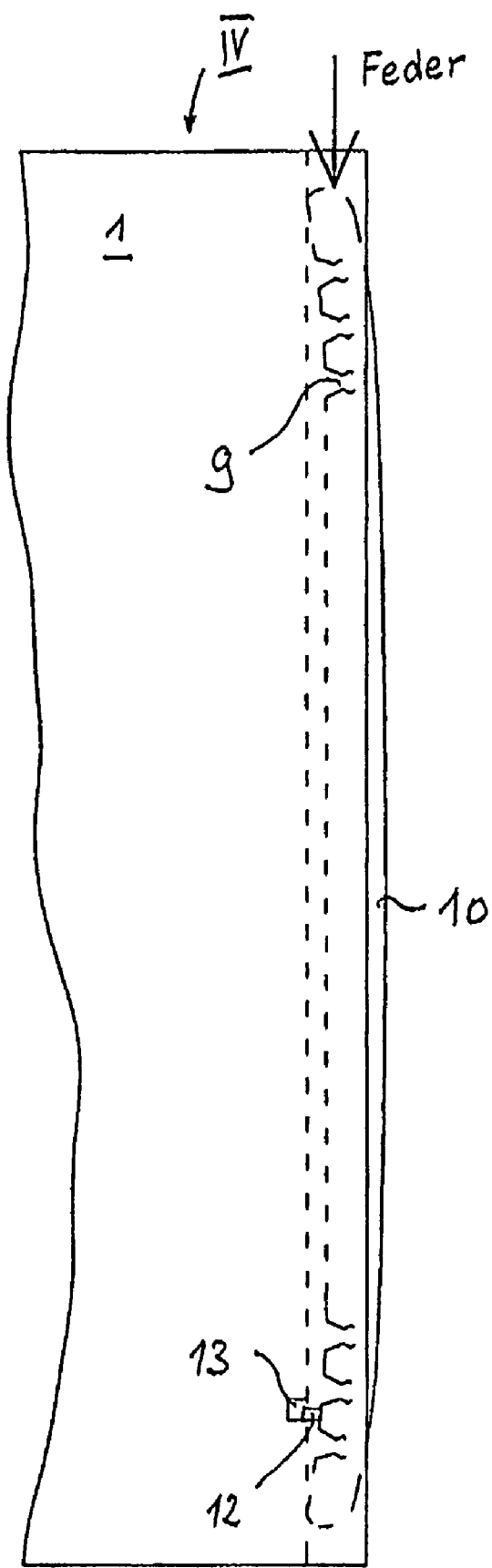
FIG. 2 shows a plan view according to FIG. 1 in a second position of the locking element.
Figure 3:
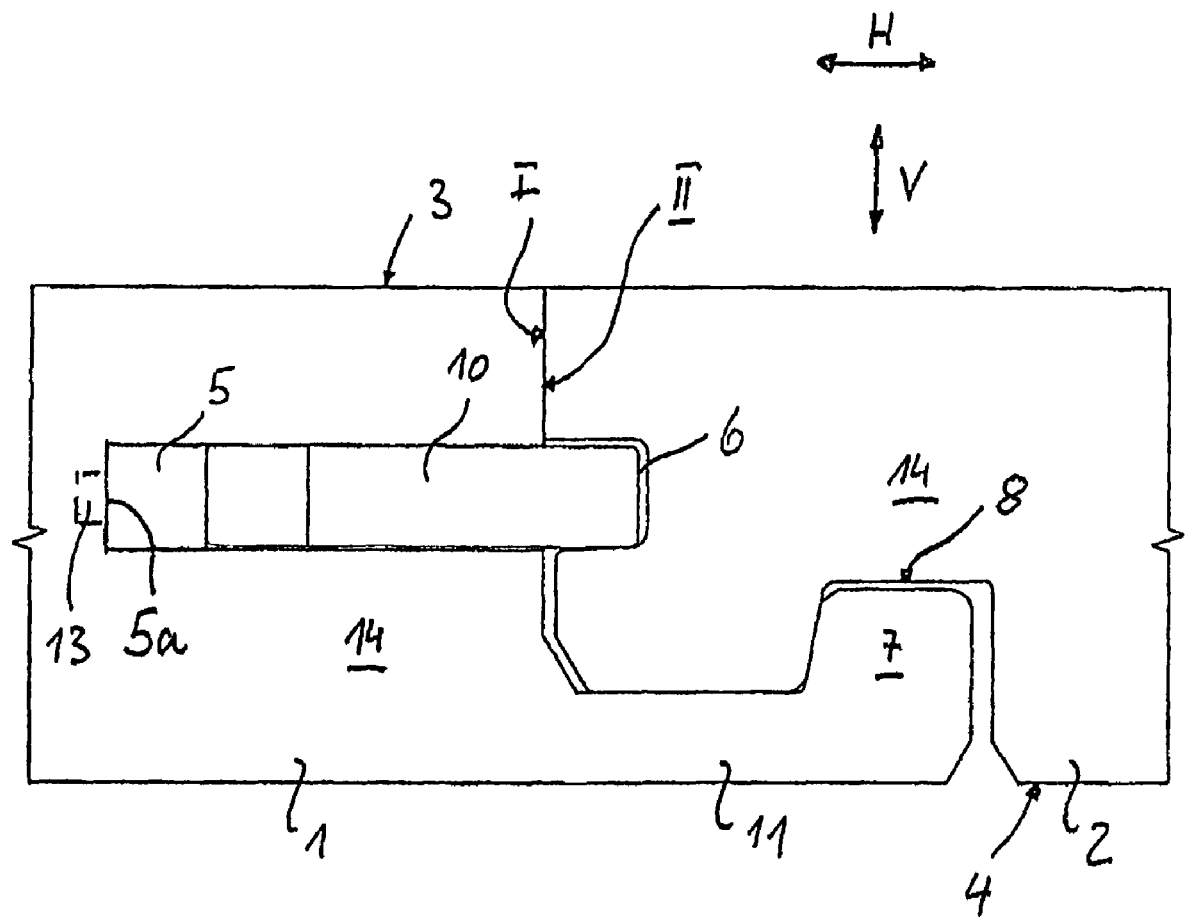
FIG. 3 shows a side view of two panels connected to one another in the area of the joint.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Referring to FIGS. 1-6, the building board is preferably a flooring panel 1, 2, 1', 2', 1", 2" with a core 14 of wood material (MDF or HDF) or a wood material/plastic mixture. A decorative layer with, for example, a wood grain can be adhered to the core 14 as a visible side 3 or pressed with the core or the pattern can be printed directly onto the visible side 3. A groove 5, 6 respectively running parallel to the visible side 3 is milled into the core 14 on the lateral edges I, II lying opposite one another in the same horizontal plane. The grooves 5, 6 can be embodied with identical depth or, as the figures show, with different depths. The figures can also equally represent the identical depth. A locking element 10 of plastic essentially extending over the entire length I of the groove 5 is placed in the deeper (first) groove 5. The locking element 10 projects outwards over the groove 5 with one of its free ends 10'.

The lateral edges I, II are profiled in a hook-shaped manner so that two panels 1, 2 connected to one another are locked in the horizontal direction H. To this end, a lower lip 11 projecting laterally over the lateral edge I is provided on the underside 4 on a lateral edge I, which lower lip has an outer projection 7 projecting upwards. A recess 8 corresponding to the projection 7 is arranged on the lateral edge II lying opposite. The recess 8 is graduated, so that the panel 2 bears against the lower lip 11 of the panel 1 and the panels 1, 2 are supported in the vertical direction V.

On its rear side in the area of the front free end 10", the locking element 10 has a projection 12 that is accommodated in a recess 13, which projects horizontally into the core 14 in the groove base 5a of the first groove 5. The cross section of the locking element 10 is essentially rectangular. The depth of the depression 13 is selected such that the projection 12 of the locking element 10 is fully accommodated therein. In an alternative embodiment (FIG. 6), the projection 15 can be provided on the top of the locking element 10 and engages in a recess provided on the underside of the tongue of the lateral edge III running perpendicular to the lateral edge I. In both cases, the locking element 10 can be fixed, for example glued, to the projection 12 or 15 in the depression 13. The depression 13 is produced by an immersing tool in the machining of the cross profile to produce a recess with base. In the alternative embodiment, the depression can also be made by a conventional tool in the machining of the longitudinal profile as a through groove in the underside of the tongue.

Before the joining of two panels 1, 2, the locking element 10 is located in the groove 5 such that it is completely arranged inside the groove 5 and projects out of the groove only with its end 10' (FIG. 1). The projection 12 of the locking element 10 lies completely in the depression 13 of the groove 5.

Figure 4:
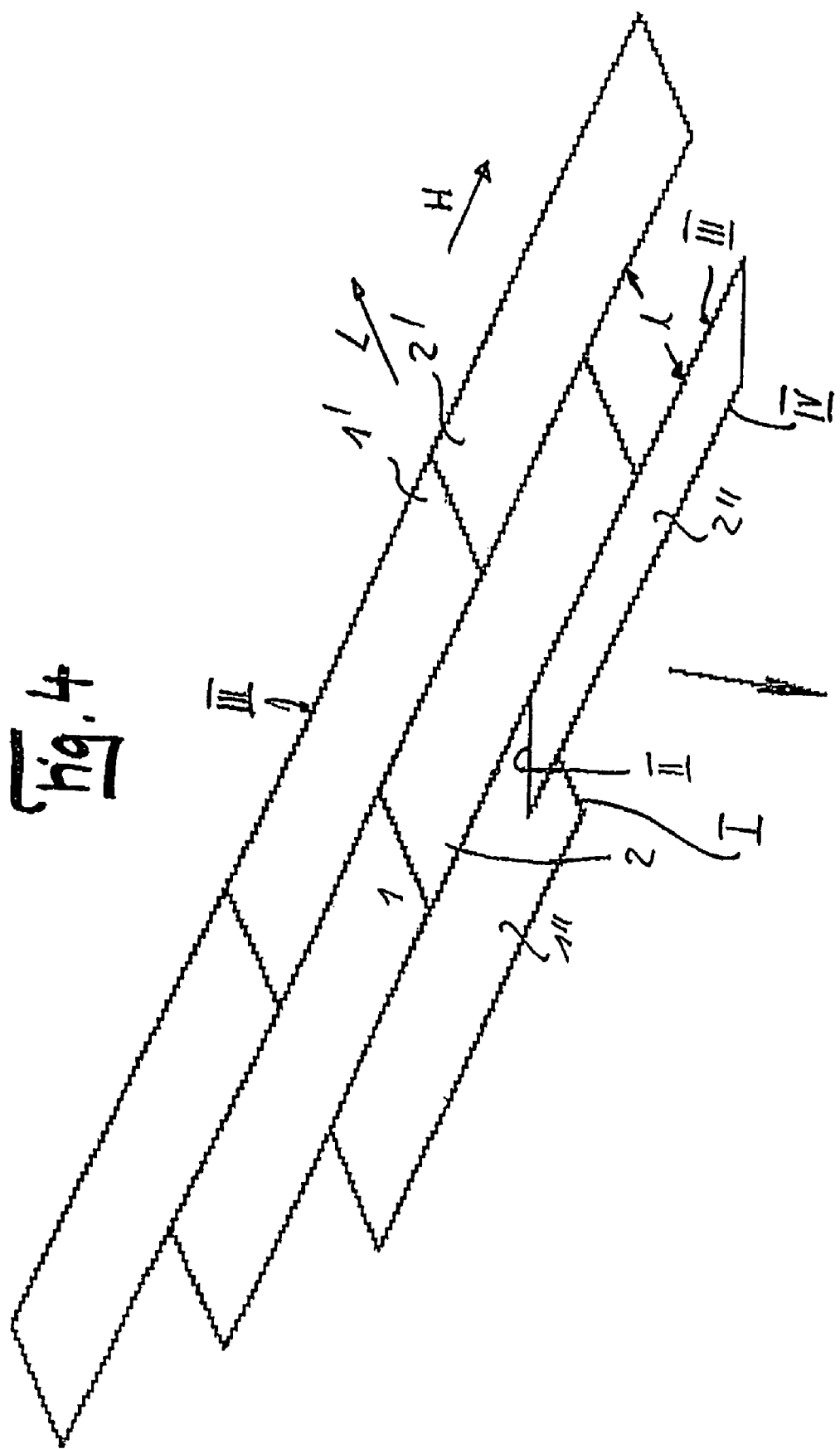
FIG. 4 shows a perspective representation of a partially laid assembly of building boards.
Figure 5:
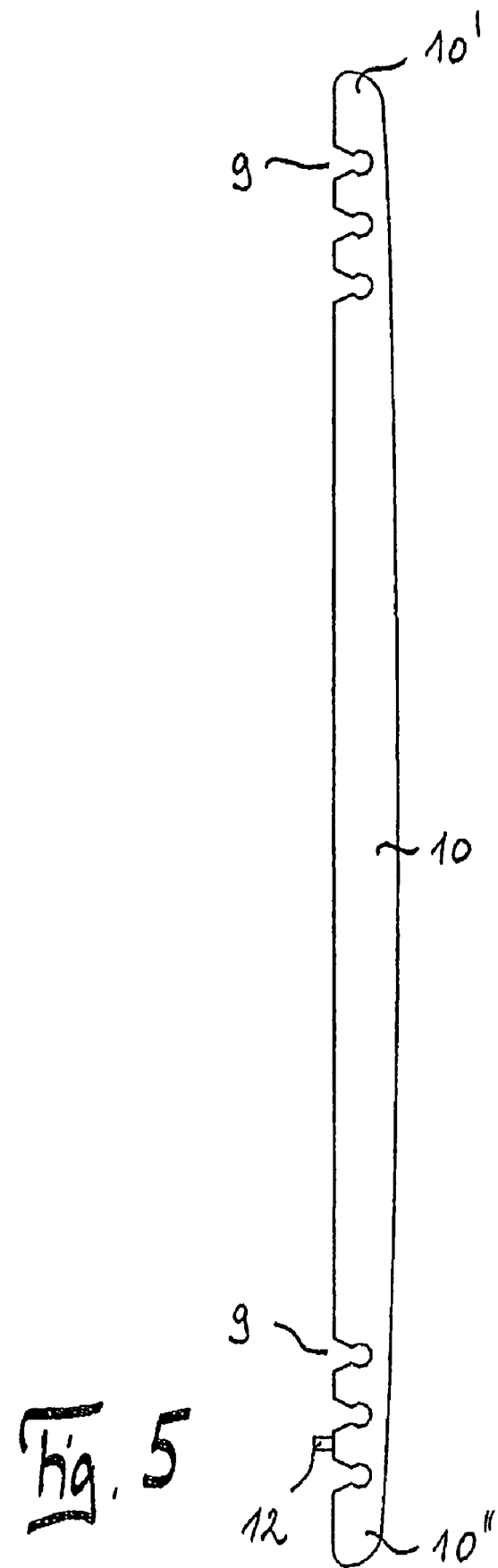
FIG. 5 shows a plan view of a first locking element.
Figure 6:
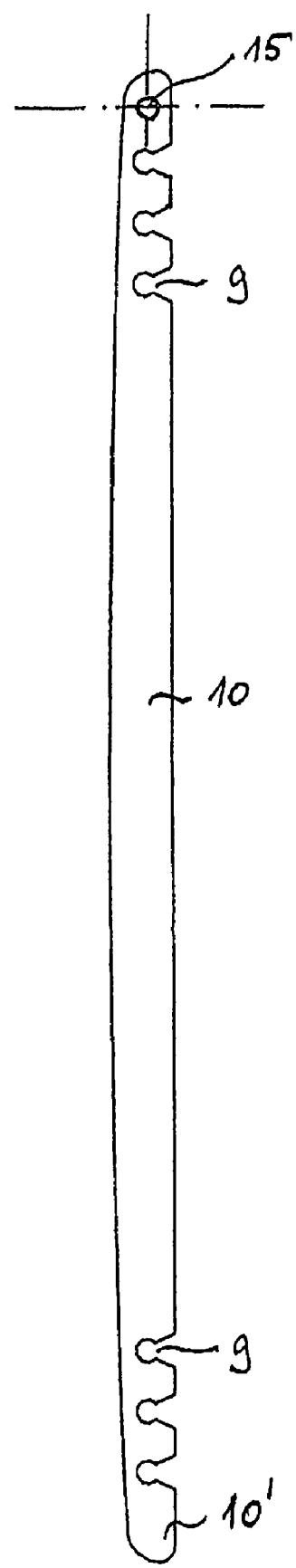
FIG. 6 shows a plan view of a second locking element.

FIG. 4 clarifies the manner of connecting two panels 1, 2 on their transverse sides. Firstly, a panel 1, which accommodates the locking element 10 in its groove 5, is connected with the aid of a tongue/groove profile present on its longitudinal sides III, IV, as described, for example, in DE 102 30 818 B3 or DE 102 52 864 A1 on the longitudinal side to two panels 1', 2' already laid and lowered to the subfloor. Then, a further panel 2, which has the same longitudinal profile, is inserted therewith into the longitudinal profile of the panel 2' already laid, but not yet lowered. The top of the panel 2 thereby has an angle of approx. 20° to the top of the panels 1', 2' already laid. Then, the panel 2 is pushed in the longitudinal direction of the first panel 1 already lowered until its transverse side (lateral edge) at the transition to the top comes in contact with the lateral edge I of the panel 1 already laid. Then, the panel 2 is angled and lowered to the subfloor. On the transverse sides the panels 1, 2 are connected to one another and locked in the horizontal direction via the hook profile. The locking element 10 is still situated fully in the groove 5 and projects with its outer end out of the groove 5. When a new panel 1", 2" is angled at the joint at the longitudinal side, as has been described above, the tongue of the newly laid panel 1", 2" abuts against the end 10' of the locking element 10 projecting out of the groove 5 and presses it in the longitudinal direction L when the panel 1', 2' is lowered to the subfloor. Since the locking element with its projection 12 is fixed in the groove 5, it cannot be displaced in the longitudinal direction L, but it is deflected in the transverse direction H such that it buckles and bends out laterally. Thereby the area of the locking element 10 bending out reaches the opposite groove 6 of the panel 2. When the new panel 1", 2" is completely lowered to the subfloor, the locking element 10 is also bent out to the maximum and the panels 1, 2 are locked to one another in the vertical direction V. The panels 1, 2 in the first row can also be locked to one another in the vertical direction V since, deviating from the conventional requirement of needing a counter pressure through a panel already laid, the locking in place in the groove in the activation of the locking element renders possible the engagement in the locking groove without a counter pressure to be exerted from outside being necessary.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A device for locking two building boards connected to one another in a direction (V) perpendicular to a visible side, comprising:

a first building board with a lateral edge (I) and a first groove provided in a core of the building board and running parallel to the visible side;

at least one second building board with a lateral edge (II) and with a second groove provided in the core of the building board and running parallel to the visible side; and a locking element that is placed in the first groove of the first building board in order to engage in the second groove of the second building board, when the first groove and the second groove have reached an overlapping position after connection of the building boards by a vertical lowering movement, to lock the two building boards in a direction (H) parallel to the visible side, on one of the lateral edges (I), a lower lip projecting laterally beyond the lateral edges with an outer projection projecting upwards is provided and on the lateral edge (II) lying opposite the lateral edge (I), a depression is provided directed towards an underside, the depression is embodied in a manner corresponding to the projection, the locking element is configured to be bent out in a transverse direction (H) by forces acting thereon in a longitudinal direction (L), and the locking element has at least one projection facing a groove base, a portion of the projection at least partially extends and is fixed in a depression provided in said groove base of the first groove and projecting into the core and locked in place based on the longitudinal direction (L).

2. The device according to claim 1, wherein the projection of the locking element is fixed in the depression.

3. A device for locking two building boards connected to one another in a direction (V) perpendicular to a visible side, comprising:

a first building board with a lateral edge (I) and a first groove provided in a core of the building board and running parallel to the visible side;

at least one second building board with a lateral edge (II) and with a second groove provided in the core of the building board and running parallel to the visible side; and a locking element that is placed in the first groove of the first building board in order to engage in the second groove of the second building board, when both the first and second groove have reached an overlapping position after connection of the building boards by a vertical lowering movement, to lock the two building boards in a direction (H) parallel to the visible side, on one of the lateral edges (I), a lower lip projecting beyond the lateral edge (I) with an outer projection projecting upwards and on the lateral edge (II) lying opposite the lateral edge (I) a depression is provided directed towards an underside, the depression being embodied in a manner corresponding to the projection, the locking element is configured to be bent out in a transverse direction (H) by forces acting thereon in the longitudinal direction (L), the locking element has a projection projecting upwards on one of its free ends, the projection engages in a depression provided on an underside of a lateral edge III running at a right angle to the lateral edge (I) provided on the tongue, and the locking element is locked in place based on the longitudinal direction (L).

4. The device according to claim 3, wherein the projection of the locking element is fixed in the depression.

5. The device according to claim 3, wherein the locking element in a first position projects out of the first groove with the free end in the longitudinal direction (L) and in a second position is received in the first groove and additionally engages in the second groove.

6. The device according to claim 3, wherein the locking element has a plurality of cut-outs inserted in the transverse direction (H) to increase its elasticity.

7. The device according to claim 6, wherein the cut-outs are spaced at regular intervals.

8. The device according to claim 6, wherein the cut-outs are provided only in a area of the free ends of the locking element.

9. The device according to claim 3, wherein the locking element has essentially a same length (l) as the first groove.

10. The device according to claim 3, wherein the locking element comprises plastic or a wood material/plastic mixture or metal.

11. The device according to claim 3, wherein the connection of the building boards another lateral edges (III, IV) to other building boards is provided by a tongue/groove profile.

12. The device according to claim 11, wherein the connection on the other lateral edges (III, IV) is provided by angling and lowering a panel to be newly laid.

13. The device according to claim 1, wherein the flooring panels include a core of wood material or wood material/plastic mixture.

14. The device according to claim 3, wherein the flooring panels include a core of wood material or wood material/plastic mixture.

* * * * *